United States Patent
Jonnada et al.

(10) Patent No.: US 11,841,773 B2
(45) Date of Patent: Dec. 12, 2023

(54) PERSISTENCE OF LEARNED PROFILES

(71) Applicant: Dell Products L.P., Round Rock, TX (US)

(72) Inventors: Jagadish Babu Jonnada, Leander, TX (US); Nikhil Manohar Vichare, Austin, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/475,307

(22) Filed: Sep. 14, 2021

(65) Prior Publication Data

US 2023/0079463 A1   Mar. 16, 2023

(51) Int. Cl.
    *G06F 11/14*   (2006.01)
    *G06F 3/06*    (2006.01)

(52) U.S. Cl.
    CPC .......... *G06F 11/1469* (2013.01); *G06F 3/065* (2013.01); *G06F 3/0619* (2013.01); *G06F 3/0679* (2013.01); *G06F 11/1451* (2013.01); *G06F 2201/82* (2013.01)

(58) Field of Classification Search
    CPC ............. G06F 11/1469; G06F 11/1451; G06F 3/0619; G06F 3/065; G06F 3/0679; G06F 2201/82
    See application file for complete search history.

(56) References Cited

U.S. PATENT DOCUMENTS

| | | | | |
|---|---|---|---|---|
| 11,513,729 | B1* | 11/2022 | Ben-Yehuda | G06F 3/0604 |
| 2010/0138177 | A1* | 6/2010 | Yu | G01R 31/367 |
| | | | | 702/63 |
| 2010/0216521 | A1* | 8/2010 | Wu | H04W 52/0258 |
| | | | | 455/572 |
| 2010/0241616 | A1* | 9/2010 | Murphy | G06F 11/004 |
| | | | | 707/661 |
| 2015/0350159 | A1* | 12/2015 | Verma | H04L 43/0888 |
| | | | | 370/329 |
| 2018/0018237 | A1* | 1/2018 | Morita | G06F 11/2074 |
| 2020/0050510 | A1* | 2/2020 | Chien | G06F 11/1428 |
| 2020/0097173 | A1* | 3/2020 | Kishi | G06F 12/08 |
| 2020/0244652 | A1* | 7/2020 | Iyer | H04L 9/3247 |

* cited by examiner

*Primary Examiner* — Jigar P Patel

(74) *Attorney, Agent, or Firm* — Jackson Walker L.L.P.

(57) ABSTRACT

An information handling system may include at least one processor, a physical storage resource, and a non-volatile memory other than the physical storage resource. The at least one processor may be configured to execute instructions for: storing learned profile data at the physical storage resource; in response to detection of a catastrophic event, copying the learned profile data from the physical storage resource to the non-volatile memory; and subsequent to a remediation event for the catastrophic event, restoring the learned profile data from the non-volatile memory.

12 Claims, 3 Drawing Sheets

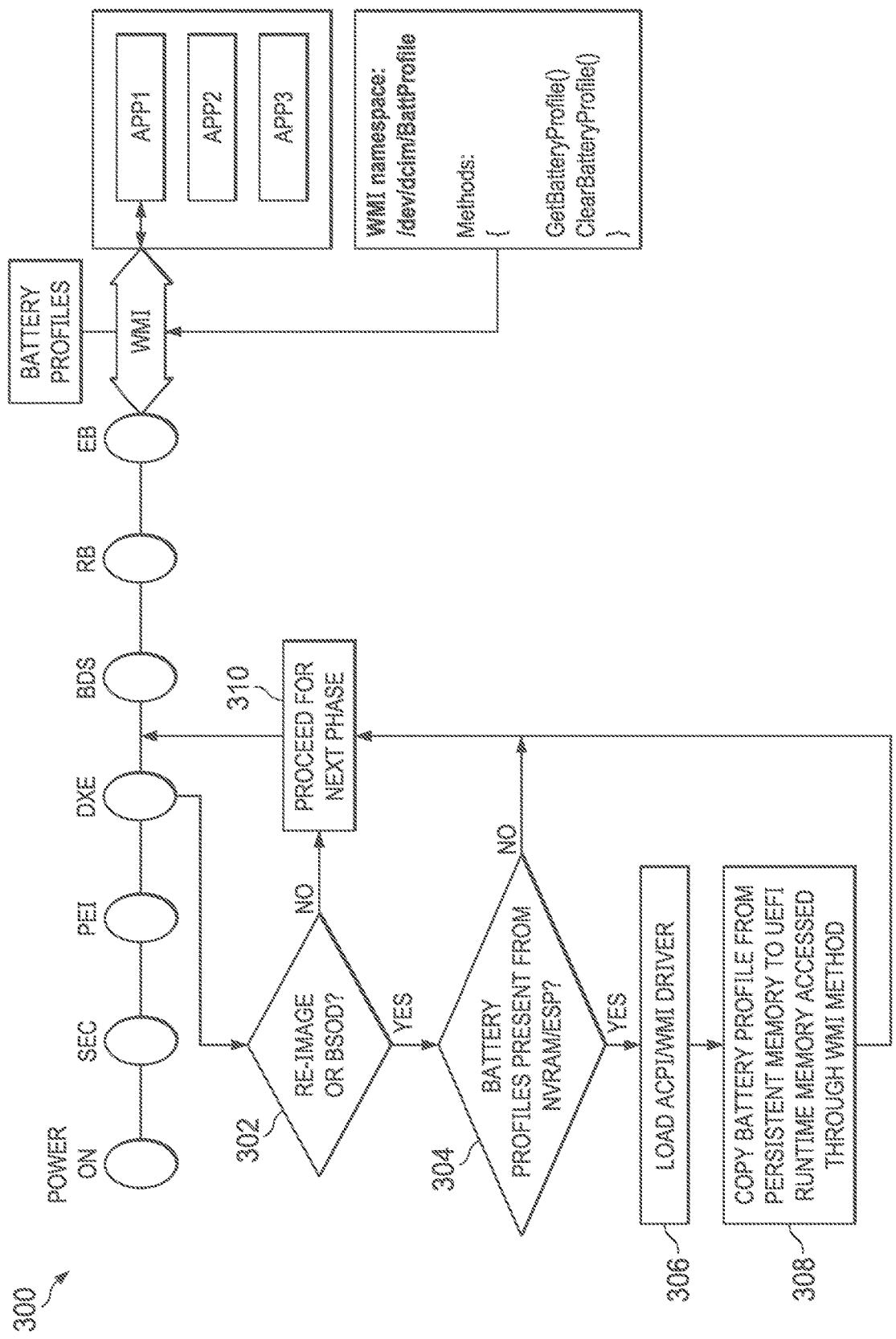

PERSISTENCE OF LEARNED PROFILES

TECHNICAL FIELD

The present disclosure relates in general to information handling systems, and more particularly to persistence of learned profiles in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Embodiments of this disclosure relate to the capability of personalizing a device's experience and performance by tracking a user's usage patterns and interpreting them (e.g., by using a model such as a pre-trained neural network to create a user- or device-specific profile). Such a profile may be used to implement various user- or device-specific settings. For purposes of this disclosure, the terms "profile," "persona," and "setting" may all be used to refer generally to such user- or device-specific information that is based on learning a user's habits over a period of time and that may be used to influence device behavior.

As one example of such a profile, a system may determine details about how a user typically charges and discharges a battery. If the user frequently lets the battery discharge to near empty, then one type of power profile may be appropriate (e.g., a profile that prioritizes low power consumption and/or fast battery charging). If the user typically recharges frequently, then a different type of power profile may be appropriate (e.g., a profile that prioritizes performance and/or overall battery health). One of ordinary skill in the art with the benefit of this disclosure will appreciate that many other factors and other types of settings may also be implemented.

The amount of time that a system takes to learn battery usage profiles and other profiles typically ranges from a few hours to several weeks, depending on what type of behavior is being observed. In many cases, the only place where these profiles are stored is on the user's physical storage resource (e.g., a hard drive or solid-state drive).

In the case of a catastrophic event which leads to the failure of an operating system (OS), the remedial actions that may be taken (e.g., system restore, reimaging the hard drive, replacing the hard drive, etc.) may wipe out any learned profiles. Thus the user will experience non-optimal settings until the profiles are re-learned.

To avoid this re-learning, embodiments of this disclosure may additionally or alternatively save the learned profiles to a storage region of the BIOS (e.g., an NVRAM chip such as flash memory). Then the OS or an application may read the profiles from the BIOS and restore them to the usual storage location such as the hard drive.

However, frequent writes to the BIOS can wear out the device, and so embodiments of this disclosure may provide a method that addresses the limitations of flash storage, copying the profiles into BIOS storage only when necessary to allow them to persist across catastrophic events (e.g., bug check, "blue screen of death" (BSOD), kernel panic, and other events) and the resulting remediation actions. Once the system is back to normal (e.g., by being restored or re-imaged, or by having the hard drive replaced), then the profiles in the BIOS persistent storage can be restored, rather than forcing the system to re-learn the profile(s) manually in a time-consuming process.

Various terms discussed herein are described in the UEFI Specification version 2.9, which was released in March 2021 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

Various terms discussed herein are described in the Advanced Configuration and Power Interface (ACPI) Specification version 6.4, which was released in January 2021 (hereinafter, ACPI Specification), which is hereby incorporated by reference in its entirety. One of ordinary skill in the art with the benefit of this disclosure will understand its applicability to other specifications (e.g., prior or successor versions of the ACPI Specification). Further, some embodiments may be applicable to different technologies other than ACPI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the non-persistence of learned profiles in information handling systems may be reduced or eliminated.

In accordance with embodiments of the present disclosure, an information handling system may include at least one processor, a physical storage resource, and a non-volatile memory other than the physical storage resource. The at least one processor may be configured to execute instructions for: storing learned profile data at the physical storage resource; in response to detection of a catastrophic event, copying the learned profile data from the physical storage resource to the non-volatile memory; and subsequent to a remediation event for the catastrophic event, restoring the learned profile data from the non-volatile memory.

In accordance with these and other embodiments of the present disclosure, a method may include an information handling system storing learned profile data at a physical storage resource of the information handling system; in response to detection of a catastrophic event, the information handling system copying the learned profile data from the physical storage resource to a non-volatile memory other than the physical storage resource; and subsequent to a remediation event for the catastrophic event, the information handling system restoring the learned profile data from the non-volatile memory.

In accordance with these and other embodiments of the present disclosure, an article of manufacture may include a non-transitory, computer-readable medium having computer-executable code thereon that is executable by a processor of an information handling system for: storing learned profile data at a physical storage resource of the information handling system; in response to detection of a catastrophic event, copying the learned profile data from the physical storage resource to a non-volatile memory other than the physical storage resource; and subsequent to a remediation event for the catastrophic event, restoring the learned profile data from the non-volatile memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example process flow, in accordance with embodiments of the present disclosure.

DETAILED DESCRIPTION

Figure 1:
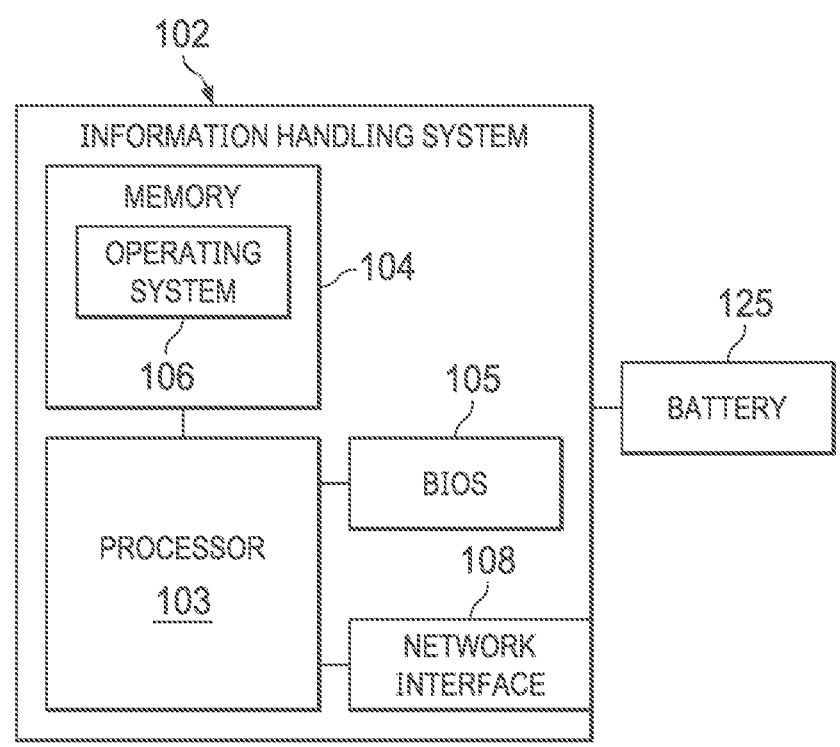
FIG. 1 illustrates a block diagram of an example information handling system, in accordance with embodiments of the present disclosure.
Figure 2:
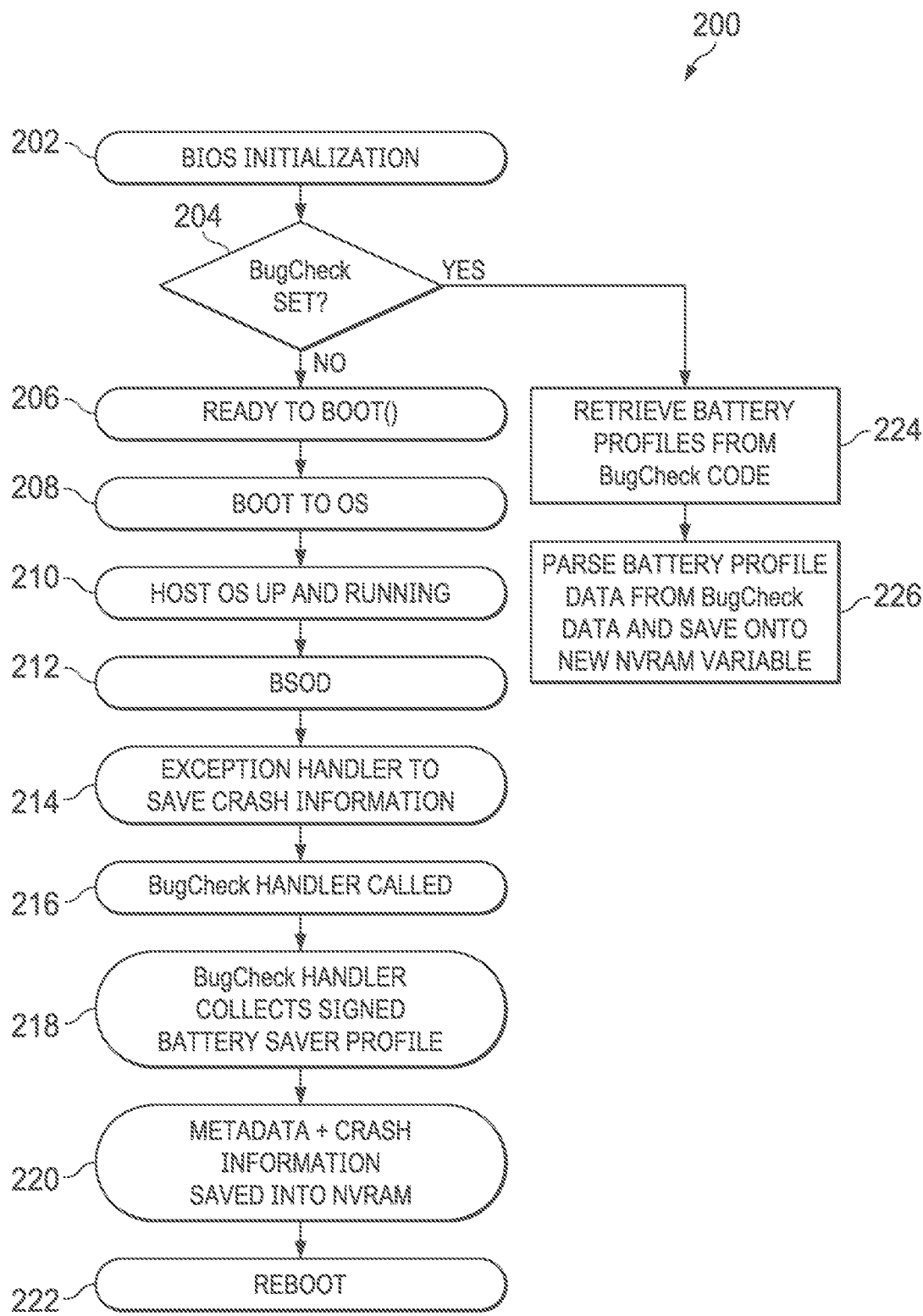
FIG. 2 illustrates an example process flow, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may in some embodiments be powered by battery 125, which may be a rechargeable battery. In addition to receiving power from battery 125, one or more components of information handling system 102 may be communicatively coupled to battery 125 so as to monitor and/or control the charging, discharging, and state of battery 125. In these and other embodiments, information handling system 102 may also include circuitry for receiving power from other sources (e.g., AC wall power, etc.), which may be used to power components of information handling system 102 and/or charge battery 125.

As discussed above, information handling system 102 may learn from user behavior to create various profiles and settings. Some examples of such profiles may include battery profiles, adaptive charging modes, workload profiles for various applications (e.g., CPU, storage, and memory allocations), various experience scores (e.g., device health, app experience, performance, and security), proxy calendar profiles, privacy profiles, and alert notification profiles. For the sake of concreteness and exposition, portions of this disclosure will discuss the example of battery profiles in detail. However, one of ordinary skill in the art with the benefit of this disclosure will understand its applicability to other types of profiles.

Turning now to FIG. 2, an example method 200 is shown for persistence of a battery profile, according to some embodiments. At step 202, the BIOS of the system begins initialization. At step 204, BIOS code may determine whether the system has encountered a catastrophic event (e.g., by determining whether a bug check variable is set or by performing any other suitable test, which may be an OS-dependent test).

If no catastrophic event is detected, the system may proceed through the ordinary boot process at steps 206, 208, and 210. An application may be registered with the OS as a bug check handler (e.g., via the BugCheckHandler( ) function on Windows or via other procedures on other OSes). Such an application may in some embodiments be an application that is provided by a manufacturer of the system and used for managing learned profiles and/or providing other support functionality.

Normal operation may continue until a catastrophic event such as a BSOD event occurs at step 212.

At step 214, in response to the catastrophic event, an exception handler may be called to save crash information prior to reboot. At step 216, the application that was registered as a bug check handler may be called as part of the exception handling process. The bug check handler may collect battery profile information at step 218, which may be signed and/or encrypted in some embodiments. At step 220, metadata and/or crash information may be saved to NVRAM (e.g., the BIOS flash storage), and this information may include the information that was collected at step 218.

Additionally or alternatively, the information collected at step 218 may be saved to other locations. For example, such data may be saved to an EFI system partition (ESI) of a physical storage resource of the system, which may also be used to persist the profile information across restore or re-imaging procedures (although generally not across replacement of the storage resource). Additionally or alternatively, the information collected at step 218 may be saved to a cloud storage location for later retrieval.

The system may then reboot at step 222.

Upon a subsequent system boot, at step 204, it may be determined that the system has encountered a catastrophic event. Then at step 224, the BIOS may retrieve the stored battery profile data from the bug check code. At step 226, the battery profile data may be parsed from the bug check data and saved onto a new variable in the NVRAM persistent space.

If remedial action is required to return the system to a working state, such remedial action may involve wiping or replacing the physical storage resource which stores the battery profile. After such remedial action is completed, the battery profile may then be restored from the NVRAM persistent space to the physical storage resource.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Turning now to FIG. 3, an example method 300 is shown for using a battery profile that has been stored in NVRAM instead of re-learning the profile, according to some embodiments. FIG. 3 illustrates standard boot phases security (SEC), pre-EFI initialization environment (PEI), driver execution environment (DXE), and boot device selection (BDS), as well as the ReadyToBoot (RB) and ExitToBoot (EB) events.

In some embodiments, the system BIOS may create and install a manufacturer-specific (or vendor-specific) custom ACPI table where the battery profile and any other profile data may be stored. The BIOS may also create a Windows Management Instrumentation (WMI) namespace and one or more WMI methods to fetch and clear the stored profiles from the custom ACPI table.

At step 302, during BIOS initialization at the DXE phase, the system may determine whether a catastrophic event such as a re-image or a BSOD has occurred by reading BIOS telemetry events. If not, the system may proceed to the next boot phase at step 310 and boot normally.

If a catastrophic event has occurred, then at step 304, the system may determine whether any stored battery profiles are present. This may include searching the BIOS NVRAM, the ESP partition, a cloud storage location, and/or any other suitable storage location. If no stored battery profile is present, then the system may proceed to the next boot phase at step 310 and boot normally.

If a battery profile is present, then the system may load an ACPI/WMI driver at step 306. As noted above, a manufacturer-specific custom ACPI table may be used to store battery profiles. A WMI namespace and corresponding methods may be used to fetch and clear the stored profiles from the custom ACPI table.

At step 308, the system may copy any battery profiles that are present to the UEFI runtime memory, which may be accessed through WMI methods as shown. For example, this embodiment includes methods such as GetBatteryProfile( ) and ClearBatteryProfile( ). To use the profile data during runtime, applications (e.g., manufacturer support applications) may use a WMI method to query the battery profiles that have been saved. A WMI method may also in some embodiments be used to clear the battery profiles after they have been successfully read and copied.

Finally, the system may proceed to the next boot phase at step 310 and continue booting.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Accordingly, embodiments of this disclosure may allow for storage of vendor- and/or manufacturer-specific custom learned profiles at the BIOS upon detection of catastrophic system events. Embodiments may also allow for dynamically enabling a WMI namespace for accessing profiles upon detection of a system event such as re-imaging, BSOD, etc.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a battery;
   at least one processor;
   a physical storage resource; and
   a non-volatile memory other than the physical storage resource;
   wherein the at least one processor is configured to execute instructions for:
   storing learned profile data at the physical storage resource, wherein the learned profile data includes data usable to control charging and/or discharging of the battery;

in response to, and subsequent to, detection of a catastrophic event that has affected the information handling system, copying the learned profile data from the physical storage resource to the non-volatile memory, wherein the catastrophic event is selected from the group consisting of bug check events, blue screen of death events, and kernel panic events; and subsequent to a remediation event for the catastrophic event, restoring the learned profile data from the non-volatile memory.

2. The information handling system of claim 1, wherein the non-volatile memory is an integrated circuit that comprises a Unified Extensible Firmware Interface (UEFI) Basic Input/Output System (BIOS) of the information handling system.

3. The information handling system of claim 1, wherein the remediation event is selected from the group consisting of restoring an operating system (OS) of the information handling system, re-imaging the physical storage resource, and replacing the physical storage resource.

4. The information handling system of claim 1, wherein the physical storage resource is a hard disk drive.

5. A method comprising:

an information handling system storing learned profile data at a physical storage resource of the information handling system, wherein the learned profile data includes data usable to control charging and/or discharging of a battery of the information handling system;

in response to, and subsequent to, detection of a catastrophic event that has affected the information handling system, the information handling system copying the learned profile data from the physical storage resource to a non-volatile memory other than the physical storage resource, wherein the catastrophic event is selected from the group consisting of bug check events, blue screen of death events, and kernel panic events; and subsequent to a remediation event for the catastrophic event, the information handling system restoring the learned profile data from the non-volatile memory.

6. The method of claim 5, wherein the non-volatile memory is an integrated circuit that comprises a Unified Extensible Firmware Interface (UEFI) Basic Input/Output System (BIOS) of the information handling system.

7. The method of claim 5, wherein the remediation event is selected from the group consisting of restoring an operating system (OS) of the information handling system, re-imaging the physical storage resource, and replacing the physical storage resource.

8. The method of claim 5, wherein the physical storage resource is a hard disk drive.

9. An article of manufacture comprising a non-transitory, computer-readable medium having computer-executable code thereon that is executable by a processor of an information handling system for:

storing learned profile data at a physical storage resource of the information handling system, wherein the learned profile data includes data usable to control charging and/or discharging of a battery of the information handling system;

in response to, and subsequent to, detection of a catastrophic event that has affected the information handling system, copying the learned profile data from the physical storage resource to a non-volatile memory other than the physical storage resource, wherein the catastrophic event is selected from the group consisting of bug check events, blue screen of death events, and kernel panic events; and subsequent to a remediation event for the catastrophic event, restoring the learned profile data from the non-volatile memory.

10. The article of claim 9, wherein the non-volatile memory is an integrated circuit that comprises a Unified Extensible Firmware Interface (UEFI) Basic Input/Output System (BIOS) of the information handling system.

11. The article of claim 9, wherein the remediation event is selected from the group consisting of restoring an operating system (OS) of the information handling system, re-imaging the physical storage resource, and replacing the physical storage resource.

12. The article of claim 9, wherein the physical storage resource is a hard disk drive.

* * * * *